INVENTOR.
WOLF RODENACKER

United States Patent Office 3,256,561
Patented June 21, 1966

3,256,561
SCREW EXTRUDER FOR MELTING THERMO-PLASTIC SYNTHETIC RESINS
Wolf Rodenacker, Dormagen, Germany, assignor to Farbenfabriken Bayer Aktiengesellschaft, Leverkusen, Germany, a German corporation
Filed July 23, 1964, Ser. No. 384,591
Claims priority, application Germany, July 31, 1963, F 40,378
5 Claims. (Cl. 18—12)

This invention relates to a screw extruder for melting thermoplastic synthetic resins, especially polyamides or polyurethanes.

In the extruder disclosed in US Patent 3,131,430 the screw housing is formed, at least in the region of a tempering zone (which is in front of the melt zone when viewed in the direction of delivery and is heated to a lower temperature than the melt zone) as a torsion body clamped at one end and to the free end of which a lever is attached which operates in known manner an on and off contact for operating a dosing device for the material that is to be melted.

If the rate of delivery of solid material to the screw exceeds the quantity of melt removed, which is accurately controlled e.g. by an automatic delivery pump, then the solid liquid phase boundary inside the screw is shifted in the direction of the inlet aperture of the solid material; the point of attack of the synthetic material contained in the phase boundary migrates toward the inlet aperture, thus increasing the torque and changing the torsion of the screw housing.

It has now been found that considerable increase in the melt output can be achieved while accurately maintaining the quantity the melt removed if the screw ends, according to the invention, with its threads at the outlet of the tempering zone and a stirrer is arranged in the melt zone of the housing. The screw and stirrer may be made in one piece; the stirrer may be in the form of a stirring fork.

To increase the heat output of the heating jacket of the melt zone, a fixed immersion heater is arranged between the prongs of the stirring fork so that maximum melt efficiency can be achieved.

Embodiments of the invention are shown schematically by way of examples in the drawing.

Figure 1:
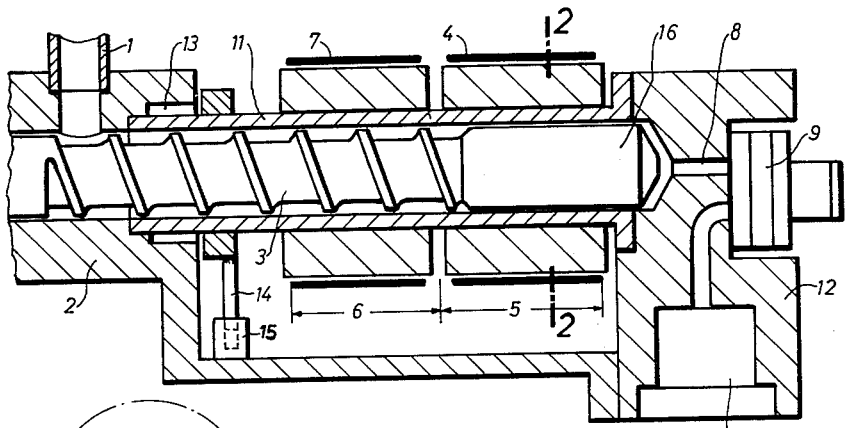
FIGURE 1 is a longitudinal section through a screw extruder in which the screw ends in a flat paddle mixer in the melt zone.
Figure 2:
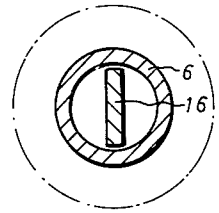
FIGURE 2 is a cross-section through this extruder in the direction 2—2.

The material which is to be melted, in, for example the form of shavings, is fed through a feedpipe 1 of a housing 2 which is rigidly connected to a pump housing 12, and is thus charged without pressure on to a screw 3 rotating in the housing 2 and a housing socket 11. It is thus conveyed to the right into the melt zone 5 which is provided with external heating means 4. Between the feedpipe 1 and the melt zone 5, the material must pass through a tempering zone 6 which is kept at a predetermined temperature, lower than the temperature in the melt zone 5. The heating means for the zone 6 is indicated at 7. A gear wheel pump 9 removes a certain quantity of material from the melt zone 5 through a duct 8 and delivers it under pressure to a spinning apparatus 10. The plug of material which is formed in the tempering zone 6 consisting of shavings in the process of melting exerts a torque which is transmitted to the housing 11 which is rigidly fixed to the pump housing 12 but rotatable in the housing 2 on a needle bearing 13, so that a torsion change in the housing 11 is produced. When a change in torsion in the housing 11 occurs, a micro-switch 15 for switching on and off the drive of a dosing apparatus (not shown) is actuated by a lever 14 which is rigidly attached to the housing 11.

The melt which is permeated by shavings in the process of melting is pushed into the melt zone 5 by threads of the screw 3, and in this melt zone it is stirred by means of a paddle stirrer 16 which is suitably connected to the threads of the screw and thereby reaches the required temperature necessary for further working up of the melt.

The stirrer rotating in the melt zone may be in the form of a stirring fork 17 (FIGURES 3 and 4) the prongs of which are connected to the threads of the screw. An immersion heater 18 which is fixed to the pump housing 12 is arranged between the prongs of the stirring fork 17 to increase the rate of melting. The heating means 7 of the tempering zone 6 is adjustable to ensure constant movement of the plug of material in this zone. An almost constant pressure of any value can be obtained in the melting screw by adjusting the temperature.

As can be appreciated by the artisan from the foregoing, the screw type extruder apparatus of the invention can be viewed as comprising three basic elements, namely, a heatable housing means defining an elongated bore having an inlet and an outlet and a longitudinal zone of which constitutes a thermoplastic material melting zone, an extruder screw 3 disposed within said bore for rotation relative thereto to convey thermoplastic material from the inlet of the bore towards the outlet thereof for extrusion therefrom, and means defining a stirring fork operatively connected to the extruder screw 3 for rotation therewith.

Figure 3:
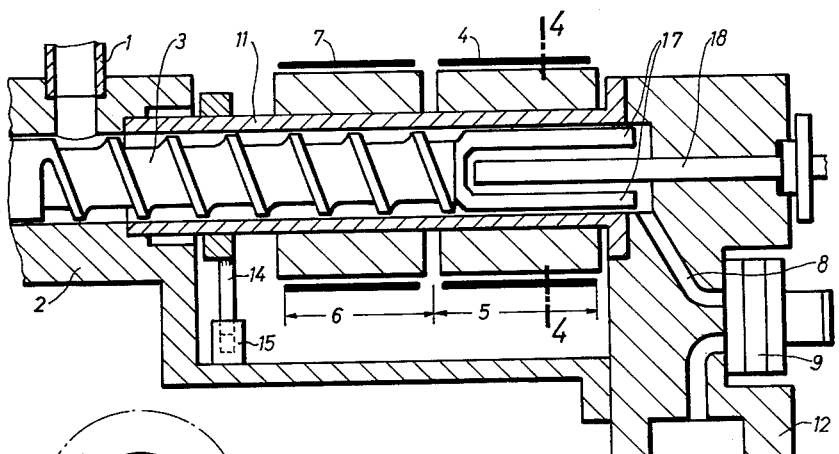
FIGURE 3 is a longitudinal section through a screw extruder in which the screw ends in a stirring fork between the prongs of which a fixed immersion heater is arranged.

In the embodiments of the invention represented by FIGS. 1 and 3, the housing means can be considered as including the housing part 2, the tubular sleeve member 11 which laterally surrounds and serves as a housing for the extruder screw 3, and the pump housing part 12. Hence, the elongated bore referred to is defined by the interior surface of the sleeve member housing 11, with the inlet of said bore being the portion thereof which is in communication with the feed pipe 1, and the outlet being the portion of said bore which is in communication with the duct 8.

Two longitudinal zones of the bore are of primary concern to the invention, namely the melting zone 5 which is adjacent to the outlet duct 8, and the tempering zone 6 which is adjacent to the melting zone 5 and located ahead of it with respect to the material flow path. The melting zone 5 is heated to a temperature for melting thermoplastic material by the heating means 4, and the tempering zone 6 is heated to a somewhat lesser temperature by the heating means 7 for the purpose of tempering the thermoplastic material conveyed by the extruder screw 3 before delivery into the melting zone 5 for completion of the melting process.

The extruder screw 3 is provided with a thread, the delivery end of which terminates at the beginning of the melting zone 5.

The means which define the stirring fork are, for example, the rod-like members 17 which extend longitudinally from the delivery end of the screw 3 into the melting zone 5, so that they stir the molten thermoplastic material therein as the screw 3 rotates.

Figure 4:
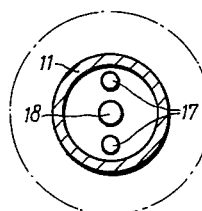
FIGURE 4 is a cross-section through this arrangement in the direction 4—4.

To aid in melting thermoplastic material fed into the melting zone, an immersion heating member 18 is provided. This heating member 18 extends into the melting zone 5 and, as illustrated by FIGS. 3 and 4, is so arranged as to permit rotation of the stirring means 17 without interference.

In general, the thermoplastic material conveyed by the screw 3 will transmit reaction torques to the sleeve housing 11 by reason of its contact with such thermoplastic material. These reaction torques are dependent upon the physical state of the material conveyed by the screw 3, with such physical state varying longitudinally along the sleeve housing 11 from unmelted or solid mterial at the receiving end of the screw 3 (near the feed pipe 1), to almost molten material at the delivery end of said screw 3. Consequently, the magnitude of these reaction torques will depend upon the difference between the delivery rate of unmelted material into the melting zone 5 and the discharge rate of molten material therefrom, because such rate differential inherently establishes the physical state distribution of the material in contact with the sleeve 11. Hence, when the discharge rate of molten material exceeds the delivery rate of unmelted material, the proportion of solid to semi-solid and almost molten material between the threaded portion of the screw 3 and the sleeve 11 will increase thereby increasing the reaction torques transmitted thereto.

These reaction torques can be utilized for control purposes to regulate the discharge rate of molten material from the apparatus in order to achieve a more uniform product flow. Such regulation is accomplished by a dosage regulating means, including the pump 9, microswitch 15 and lever arm 14. As can be readily noted from FIGS. 1 and 3, wherein the sleeve 11 is mounted for limited rotation relative to the housing part 2, the force exerted by the lever 14 upon the microswitch 15 will be directly related to the reaction torques tending to rotate sleeve 11, and thus the discharge rate of molten material can be regulated by controlling the operation of the pump 9 by the microswitch 15.

Although the housing means bore and the extruder screw 3 are preferably substantially cylindrical in shape as illustrated by FIGS. 1–4 herein, it should be noted that the geometry of the extruder screw 3 and housing means bore can be varied to suit the needs of a particular application of the invention.

I claim:

1. A screw type extruder apparatus for melting and extruding thermoplastic materials, which comprises a housing means defining an elongated bore having an inlet disposed for receiving thermoplastic material to be melted and an outlet disposed for discharging molten thermoplastic material, said housing means being heatable to maintain a longitudinal zone of said bore adjacent to the outlet thereof at a temperature for melting such thermoplastic material, an extruder screw member disposed within said bore for rotation relative thereto to convey such thermoplastic material from the bore inlet toward the bore outlet for extrusion therefrom, said extruder screw member having a thread, the delivery end of which terminates at the beginning of said melting temperature zone of the bore to feed thermoplastic material thereto, and means defining a stirring fork operatively connected to said extruder screw member for rotation therewith and extending longitudinally from the delivery end thereof into said melting temperature zone of the bore to stir the molten thermoplastic material therein.

2. The apparatus according to claim 1 including a heating member disposed for extension into said melting temperature zone of the housing bore to aid in melting thermoplastic material fed thereto.

3. The apparatus acocrding to claim 1 wherein said housing means includes a casing and a tubular sleeve member supported by said casing and disposed for limited rotation relative thereto, with the interior surface of said sleeve member defining the bore of said housing means and being disposed in surrounding relation to said extruder screw member, said sleeve member being rotatable relative to the casing in response to reaction torques transmitted to said sleeve member by contact with thermoplastic material conveyed therein by rotation of the screw member, such reaction torques being dependent in magnitude upon the difference between the delivery rate of unmelted thermoplastic material into the melting zone of said bore and the discharge rate of molten thermoplastic material therefrom, with said reaction torques increasing in magnitude as said discharge rate exceeds said delivery rate, and including dosage regulating means operatively connected to the outlet of said bore and responsive to the reaction torques transmitted to said sleeve member to regulate the discharge rate of molten thermoplastic material in accordance with said reaction torques.

4. The apparatus according to claim 1 wherein said housing means bore and said extruder screw member are substantially cylindrical.

5. The apparatus according to claim 1 including a first heating means disposed in operative engagement with said housing means to heat the melting zone of said bore to a temperature for melting thermoplastic material, and including a second heating means disposed in operative engagement with said housing means to heat a longitudinal zone of said bore adjacent to the melting zone to a lesser temperature for tempering thermoplastic material conveyed by the extruder screw member before delivery into the melting zone.

References Cited by the Examiner

UNITED STATES PATENTS

| | | | |
|---|---|---|---|
| 2,407,503 | 9/1946 | Magerkurth et al. | 18—12 |
| 2,412,709 | 12/1946 | Broling | 18—12 |
| 3,035,303 | 5/1962 | Stanley | 18—12 |

WILLIAM J. STEPHENSON, *Primary Examiner.*